(12) United States Patent
Martin et al.

(10) Patent No.: US 11,572,830 B2
(45) Date of Patent: Feb. 7, 2023

(54) METHOD AND SYSTEM FOR ON VEHICLE COMPRESSED AIR GENERATION

(71) Applicant: Ford Global Technologies, LLC, Dearborn, MI (US)

(72) Inventors: Douglas Martin, Canton, MI (US); Scott Thompson, Belleville, MI (US); John Rollinger, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 17/180,569

(22) Filed: Feb. 19, 2021

(65) Prior Publication Data

US 2022/0268208 A1  Aug. 25, 2022

(51) Int. Cl.
| | | |
|---|---|---|
| *F02C 6/08* | (2006.01) | |
| *F02C 6/12* | (2006.01) | |
| *F02B 37/18* | (2006.01) | |
| *F02D 41/00* | (2006.01) | |
| *F01N 5/04* | (2006.01) | |

(52) U.S. Cl.
CPC ............... *F02C 6/08* (2013.01); *F02B 37/18* (2013.01); *F02C 6/12* (2013.01); *F02D 41/0007* (2013.01); *F01N 5/04* (2013.01)

(58) Field of Classification Search
CPC .... F02C 6/08; F02C 6/12; F02B 37/18; F02D 41/0007; F01N 5/04
USPC .......................................................... 415/1
See application file for complete search history.

(56) References Cited

U.S. PATENT DOCUMENTS

| | | | | |
|---|---|---|---|---|
| 2,849,173 | A * | 8/1958 | Surdy | F02B 37/04 417/246 |
| 3,204,859 | A * | 9/1965 | Crooks | F02B 37/164 417/364 |
| 4,652,216 | A * | 3/1987 | Eslinger | B60T 17/02 417/252 |
| 6,877,200 | B2 | 4/2005 | Villarreal | |
| 7,870,915 | B2 | 1/2011 | Beeson et al. | |
| 9,297,325 | B2 * | 3/2016 | Sujan | F02D 41/0007 |
| 2006/0137345 | A1 * | 6/2006 | Cho | F02M 35/10157 60/605.1 |
| 2008/0264921 | A1 | 10/2008 | Kropp et al. | |
| 2017/0204818 | A1 * | 7/2017 | Siuchta | F02M 35/10386 |

(Continued)

FOREIGN PATENT DOCUMENTS

| | | | |
|---|---|---|---|
| EP | 3126649 B1 * | 12/2018 | ............ F02B 33/22 |
| FR | 2257782 A2 * | 7/1974 | ............ F02B 65/00 |
| WO | WO-2020074103 A1 * | 4/2020 | ............ B60T 17/02 |

OTHER PUBLICATIONS

"What Size Air Compressor Do I Need for Air Tools?" Garage Tool Advisor Website, Available Online at https://www.garagetooladvisor.com/air-tools/what-size-air-compressor/, Available as Early as Jul. 17, 2019, 25 pages.

(Continued)

*Primary Examiner* — J. Todd Newton
(74) *Attorney, Agent, or Firm* — Vincent Mastrogiacomo; McCoy Russell LLP

(57) ABSTRACT

Methods and systems are provided for an air system. In one example, a system includes a boost device configured to be driven by exhaust air from a plurality of cylinder in order to compress ambient air. The compressed ambient air is delivered to a tank configured to store compressed gases.

18 Claims, 4 Drawing Sheets

(56) References Cited

U.S. PATENT DOCUMENTS

2020/0011257 A1* 1/2020 Stretch .................... F02D 17/02
2020/0347757 A1* 11/2020 Lundgren ................. F01L 9/16

OTHER PUBLICATIONS

Rollinger, J. et al., "System and Method for Controlling Vehicle Accumulator Airflow," U.S. Appl. No. 16/895,771, filed Jun. 8, 2020, 70 pages.

"VBAT-X105, Air Tank, ASME Stamped," SMC Tech Website, Available Online at http://www.smcetech.com/CC_host/pages/custom/templates/smc_v2/prodtree_product_2.cfm?cc_nvl=((searchPart,VBA),(CC,SMC,A_E_US,6023A))&CFID=23829731&CFTOKEN=59251070&jsessionid=8430ef66f6c17a1235e86841542f56b1b451, Retrieved May 19, 2021, 1 page.

* cited by examiner

METHOD AND SYSTEM FOR ON VEHICLE COMPRESSED AIR GENERATION

FIELD

The present description relates generally to providing compressed air to a compressed air system.

BACKGROUND/SUMMARY

Vehicles, such as passenger vehicles and/or commercial vehicles, may be equipped with work systems for providing hydraulic and/or compressed air functionality. Compressed air may be used to drive air tools, pneumatic lifts, and other compressed air-driven devices. The work systems may be installed as an add-on system to the vehicle or may be integrally arranged in the vehicle, such as part of an accessory drive system.

These work systems may have some drawbacks. For example, they occupy space that may be used for other vehicle components or in a vehicle storage area, such as a truck bed, which may be used to transport goods. Additionally, these vehicle systems may reduce engine power output as the work system is powered by a main engine of the vehicle.

Some example approaches include arranging a secondary engine on the vehicle, the secondary engine configured to power the one or more systems of the work system. However, this may increase a cost of the work system. Furthermore, an efficiency of driving the work system may be high.

Other example approaches include supplying compressed air to the work system via a compressor driven via a turbine of an engine. To do this, exhaust gases are produced at a desired rate to supply a desired amount of compressed air to an air compressor tank of the work system. However, this approach may have the same drawback of the above example, where an efficiency of driving the work system may be high, thereby increasing vehicle emissions.

In one example, the issues described above may be addressed by a system, comprising:

a boost device arranged in an exhaust passage, wherein the boost device is driven by exhaust air from a cylinder bank of an engine and configured to compress ambient air. In this way, the cylinder bank is not fueled and emissions during the compressed air production are reduced relative to the previous examples.

As one example, an operator may select a mode for operating compressed air devices while the vehicle is stationary. The vehicle may cut-off a fuel supply to cylinders of the cylinder bank of the engine. In this way, the cylinder bank is operated as a pump via work from another fueled cylinder bank, wherein air flowing through the deactivated cylinder bank is compressed and delivered to a work system. The work system may include a passage, which bypasses a portion of an exhaust passage of the vehicle, wherein the passage comprises a booster for further increasing a pressure of the compressed air. The air is delivered to an air tank, from which compressed air may be used to operate the compressed air devices. In this way, emissions during the operation of the compressed air tool are reduced relative to the previous examples.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
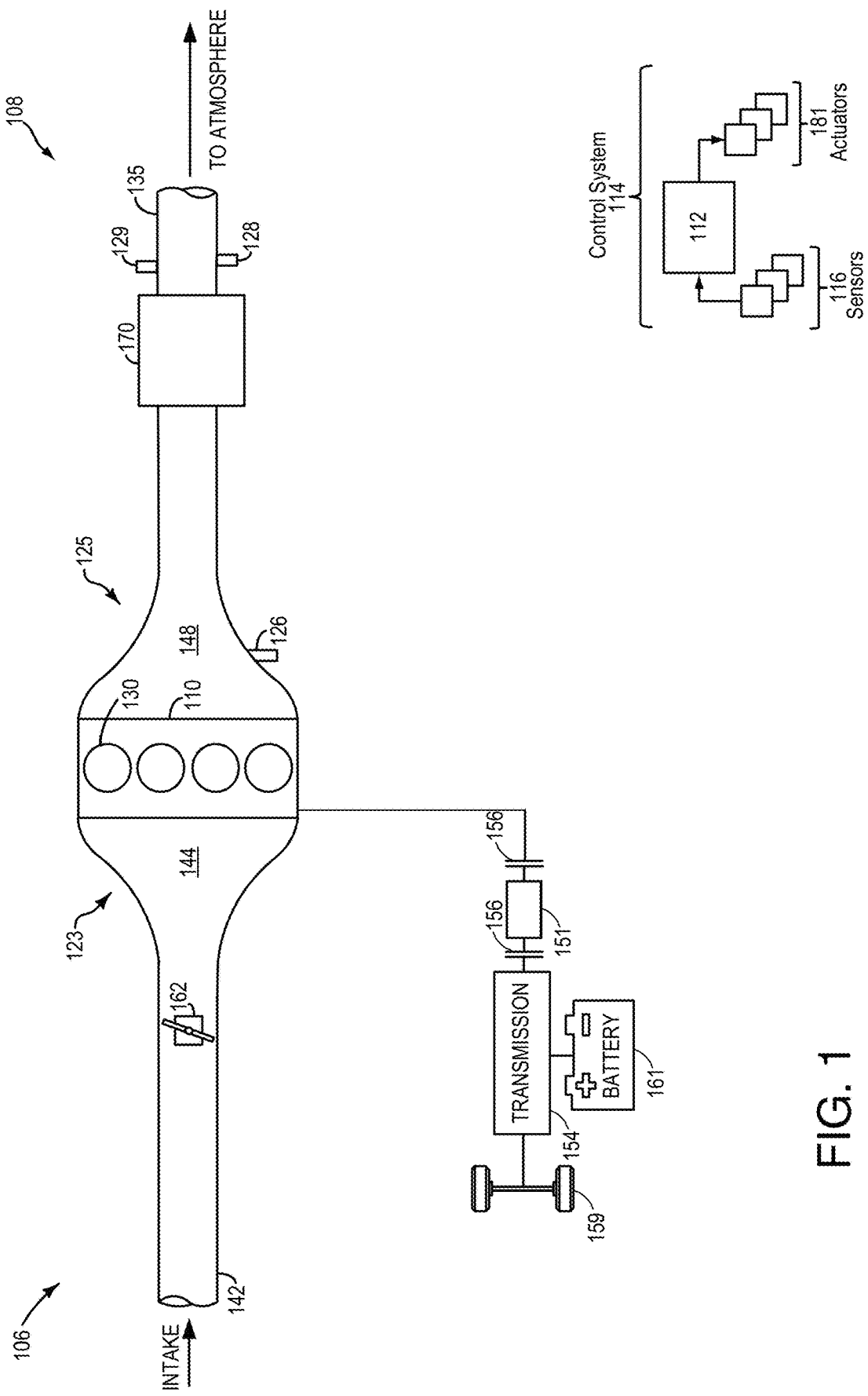
FIG. 1 shows a schematic of an engine included in a hybrid vehicle.
Figure 2:
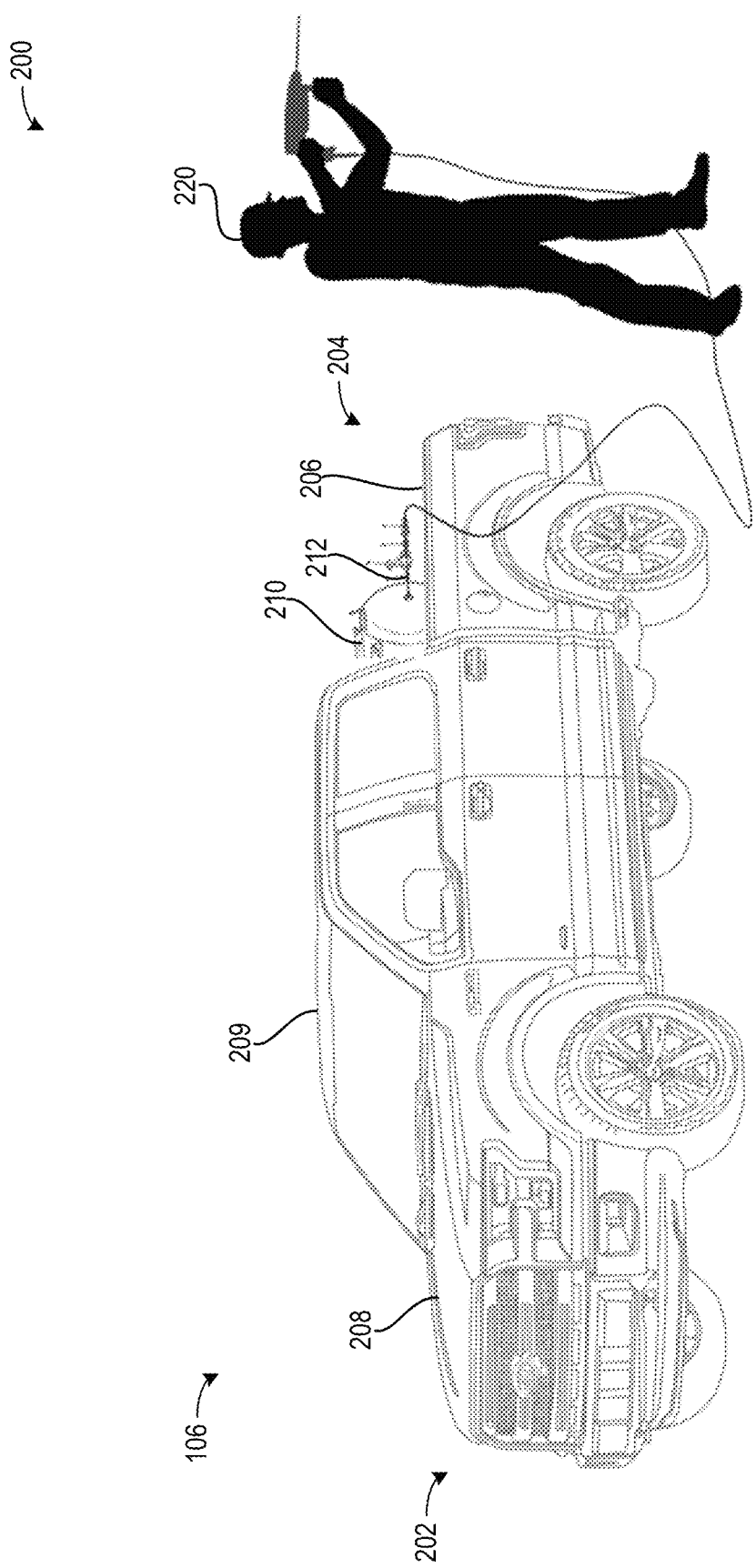
FIG. 2 shows an example of a vehicle comprising an air tank.
Figure 3:
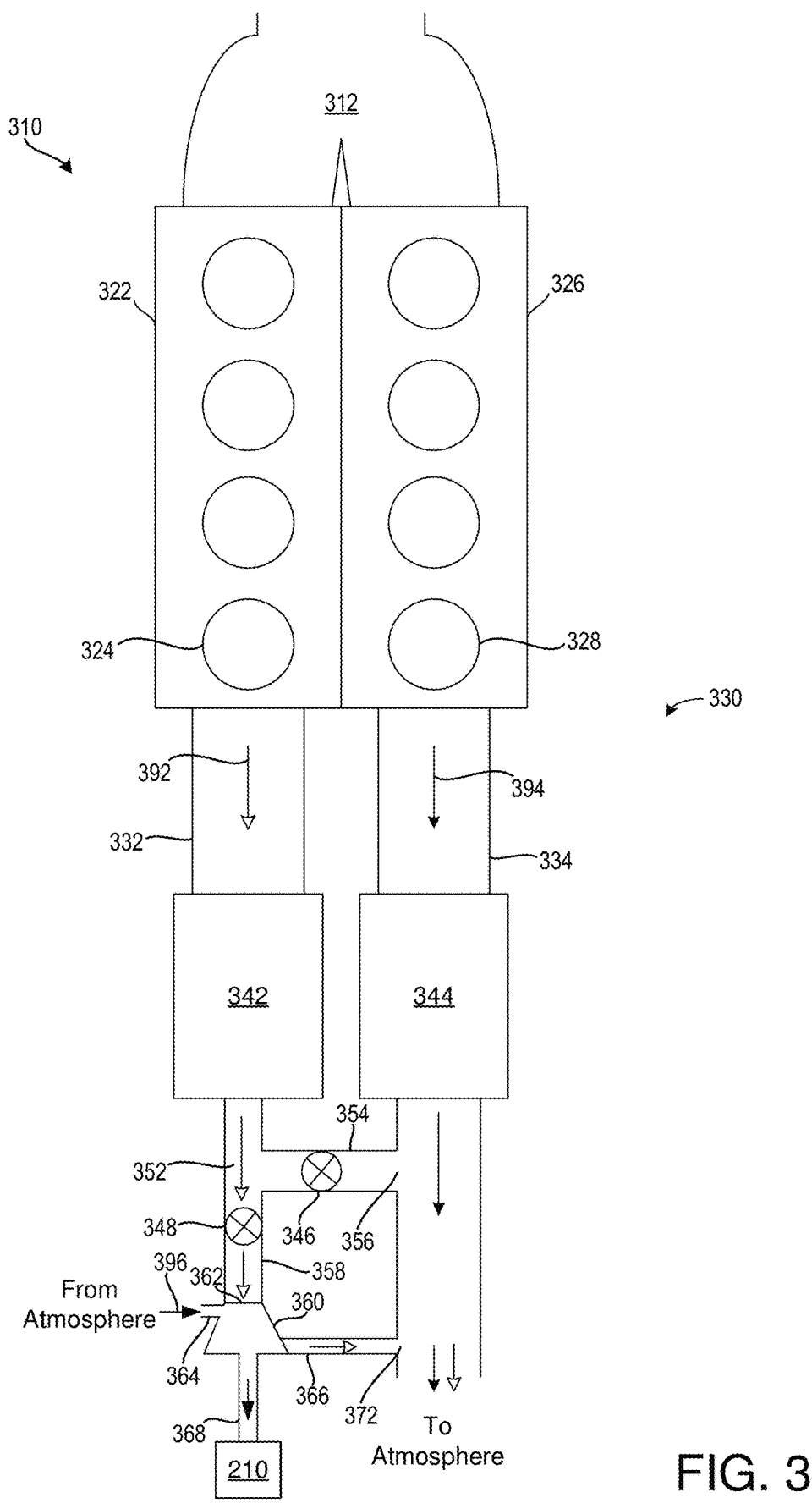
FIG. 3 shows the engine including a first cylinder bank and a second cylinder bank along with an exhaust arrangement.
Figure 4:
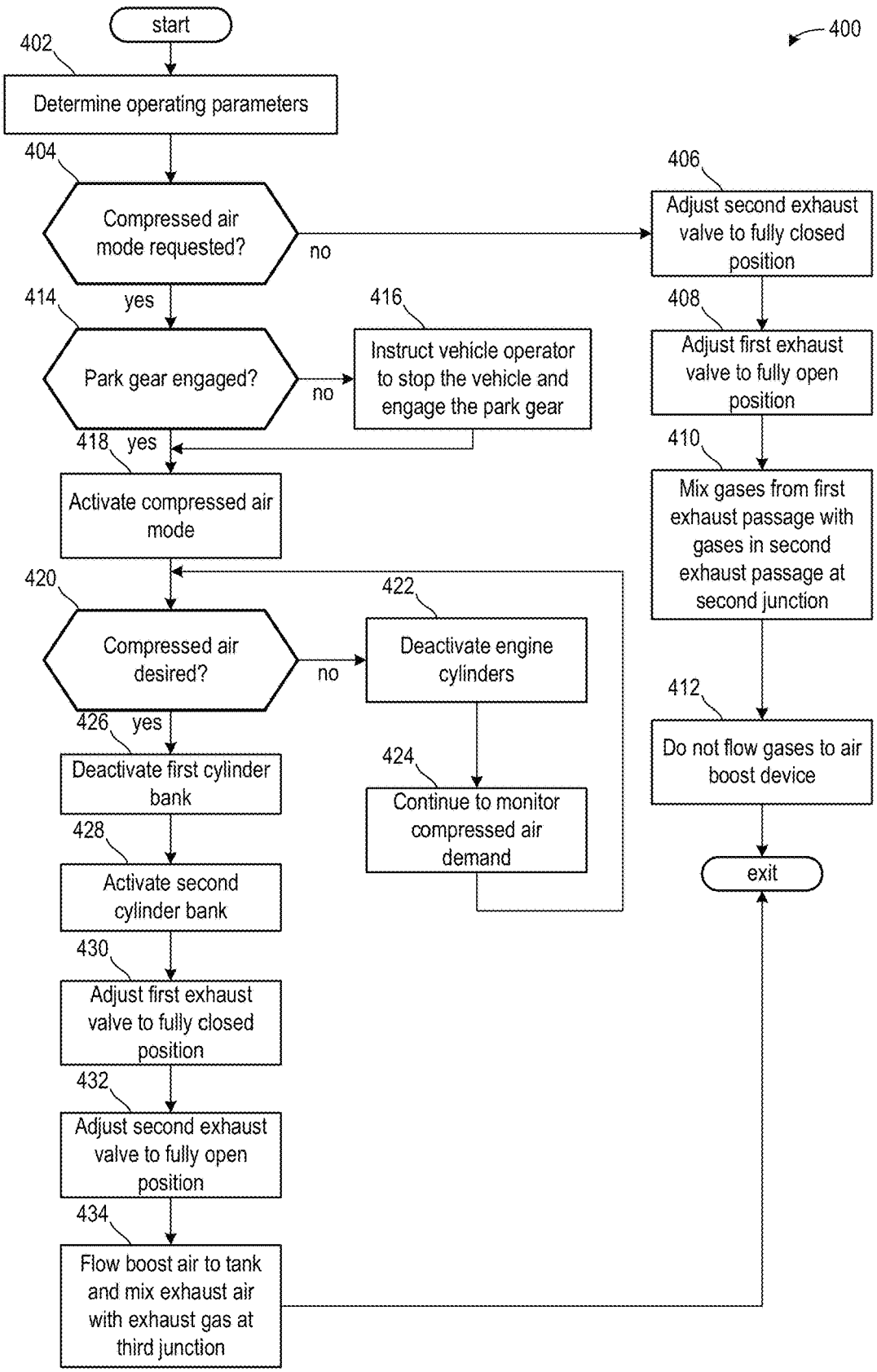
FIG. 4 illustrates a method for operating the work system in response to a request to operate a compressed air operated device.

The following description relates to systems and methods for a work system of a vehicle. The vehicle may be a hybrid vehicle including an engine and an electric motor, as illustrated in FIG. 1. The work system may include a tank for storing compressed air generated by the vehicle, as illustrated in FIG. 2. The engine may include two or more cylinder banks, wherein at least one of the two banks may be configured to deactivate during some conditions. In one example, the bank may be configured to stop fueling in response to an operator request to enter a compressed air mode. During the compressed air mode, the bank is not fueled and pistons therein are continuously oscillated with intake and exhaust valves opening and closing based on a combustion scheme. As such, air is compressed in the bank and sent to a corresponding exhaust passage from which a secondary passage extends and leads the compressed air to a booster coupled to the tank, as shown in FIG. 3. The mode may further include where the vehicle is stationary and a park gear is engaged. An example method for producing compressed air based on the systems of FIGS. 1-3 is shown in FIG. 4.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Herein, components may be described locationally as being upstream of downstream relative to one another. Upstream refers to a positional relationship between two components, wherein a first component upstream of a second component receives a fluid, such as a gas, before the second component. Thus, a third component downstream of a fourth component receives the fluid after the fourth component. In this way, upstream and downstream are in reference to a direction of gas flow.

FIG. 1 shows a schematic depiction of a hybrid vehicle system 106 that can derive propulsion power from engine system 108 and/or an on-board energy storage device. An energy conversion device, such as a generator, may be operated to absorb energy from vehicle motion and/or engine operation, and then convert the absorbed energy to an energy form suitable for storage by the energy storage device.

Engine system 108 may include an engine 110 having a plurality of cylinders 130. Engine 110 includes an engine intake 123 and an engine exhaust 125. Engine intake 123 includes an air intake throttle 162 fluidly coupled to the engine intake manifold 144 via an intake passage 142. Air may enter intake passage 142 and flow to the engine 110. Engine exhaust 125 includes an exhaust manifold 148 leading to an exhaust passage 135 that routes exhaust gas to the atmosphere. Engine exhaust 125 may include one or more emission control devices 170 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated as herein.

Vehicle system 106 may further include control system 114. Control system 114 is shown receiving information from a plurality of sensors 116 (various examples of which are described herein) and sending control signals to a plurality of actuators 181 (various examples of which are described herein). As one example, sensors 116 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 106. As another example, the actuators may include the throttle 162.

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 106 comprises multiple sources of torque available to one or more vehicle wheels 159. In other examples, vehicle 106 is a conventional vehicle with only an engine, or an electric vehicle with only electric machine(s). In the example shown, vehicle 106 includes engine 110 and an electric machine 151. Electric machine 151 may be a motor or a motor/generator. A crankshaft of engine 110 and electric machine 151 may be connected via a transmission 154 to vehicle wheels 159 when one or more clutches 156 are engaged. In the depicted example, a first clutch 156 is provided between a crankshaft and the electric machine 151, and a second clutch 156 is provided between electric machine 151 and transmission 154. Controller 112 may send a signal to an actuator of each clutch 156 to engage or disengage the clutch, so as to connect or disconnect crankshaft from electric machine 151 and the components connected thereto, and/or connect or disconnect electric machine 151 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 151 receives electrical power from a traction battery 161 to provide torque to vehicle wheels 159. Electric machine 151 may also be operated as a generator to provide electrical power to charge battery 161, for example during a braking operation.

Turning now to FIG. 2, it shows an embodiment 200 of the vehicle system 106. As such, components previously introduced may be similarly number in this figure and subsequent figures. The vehicle system 106 is illustrated as a passenger truck including a front end 202 and a rear end 204 opposite the front end 202. A bed 206 is arranged proximal to the rear end 204. An engine compartment 208 is arranged proximal to the front end 202, wherein a cabin interior 209 is arranged between the bed 206 and the engine compartment 208. It will be appreciated that the vehicle system 106 may be configured in other vehicle layouts other than a passenger truck, including a medium-duty or heavy-duty vehicle such as a commercial vehicle, a work truck, and the like.

A reservoir 210 may be arranged in the bed 206. Herein, the reservoir 210 is referred to as the tank 210. The tank 210 may be fluidly coupled to a portion of an exhaust system of the vehicle 106, such as exhaust system 125 of FIG. 1. The tank 210 may be configured to store compressed air or other compressed gas as part of a work system configured to be used at a worksite.

In the example of FIG. 2, the tank 210 is illustrated in the bed 206 of the vehicle system 106. However, it will be appreciated that the tank 210 may be arranged in a vehicle underbody, a compartment hidden from view, or other area of the vehicle system 106. A port 212 of the tank 210 may be routed from the tank 210 to an exterior of the vehicle system 106. In some examples, the port 212 may be retractable such that an amount of protrusion of the port 212 from the vehicle exterior may be adjustable at an operator's discretion.

The tank 210 may further comprise a drain for removing condensate from an interior volume of the tank 210. In some examples, the drain may expel the condensate to a ground or other surface directly below the bed 206. Additionally or alternatively, the drain may be fluidly coupled to a hose, which may route the condensate to a water storage tank. The water storage tank may comprise a spigot exposed to an exterior of the vehicle such that operator 220 may utilize the stored water when desired. Additionally or alternatively, a pump may draw water from the water storage tank to execute a water injection or other tasks known to those of ordinary skill in the art.

In the example of FIG. 2, the operator 220 is illustrated utilizing a compressed air driven device via compressed air from the tank 210. The vehicle 106 is stationary. An engine of the vehicle 106 may be currently producing compressed air or may be intermittently producing compressed air based on a load of the tank 210. In one example, the engine may produce compressed air in response to the load of the tank 210 being less than a threshold load. Additionally or alternatively, the engine may produce compressed air during an entirety of the compressed air driven device being used, which may be indicated via the operator 220 selecting a compressed air mode, as will be described in greater detail below.

Turning now to FIG. 3, it shows an example embodiment 300 of an engine 310 coupled to an exhaust system 330. The engine 310 and the exhaust system 330 may be used identically to the engine 110 and the exhaust system 125 of FIG. 1. The engine 310 may include a plurality of cylinders divided into a first bank 322 and a second bank 326. The first bank 322 may include a plurality of first cylinder 324 and the second bank 326 may include a plurality of second cylinders 328. The first bank 322 and the second bank 326 may receive air from a common intake manifold 312. However, the first bank 322 may expel exhaust gases to only a first exhaust passage 332 and the second bank 326 may expel exhaust gases to only a second exhaust passage 334, separate from the first exhaust passage 332.

The first exhaust passage 332 may direct exhaust gases from the first bank 322 to a first catalyst 342. The second exhaust passage 334 may direct exhaust gases from the second bank 326 to a second catalyst 344. The first catalyst 342 and the second catalyst 344 may be identical in size and shape. Additionally or alternatively, the first catalyst 342 and the second catalyst 344 may be identical in catalytic composition and activity. In some examples, the first catalyst 342 and the second catalyst 344 may differ as will be described herein.

In some examples, the engine 310 may include features configured to deactivate one or more cylinders. In one example, the engine 310 may be configured to deactivate only the plurality of first cylinders 324 of the first bank 322. As such, catalytic demands of gases expelled by the first bank 322 and the second bank 326 may be different. For example, the second catalyst 344 may be larger than the first catalyst 342 in anticipation of a greater amount of combustion byproducts flowing to the second catalyst 344 compared to the first catalyst 342. Additionally or alternatively, catalytic compositions of the first catalyst 342 and the second catalyst 344 may vary due to the different amounts of air flow along with the different amounts of exhaust gases flowing to the catalysts.

The first exhaust passage 332 may direct exhaust gases out of the first catalyst 342 toward a first junction 352. A first exhaust branch 354 may extend from the first junction 352 to a second junction 356, wherein the second junction 356 corresponds to an intersection between the first exhaust branch 354 and the second exhaust passage 334. A second exhaust branch 358 may extend from the first exhaust junction 352 to a boost device 360.

The exhaust system 330 further includes a first valve 346 and a second valve 348. The first valve 346 may be arranged in the first exhaust branch 354 and configured to adjust exhaust gas flow from the first exhaust branch 354 to the second exhaust passage 334. The second valve 348 may be arranged in the second exhaust branch 356 and configured to adjust exhaust gas flow from the second exhaust branch to the boost device 360. In some examples, additionally or alternatively, the first valve 346 and the second valve 348 may be replaced by a combination valve (e.g., a three-way valve) without departing from the scope of the present disclosure. Actuators of the first valve 346 and the second valve 348 may be configured to receive a signal from a controller, such as controller 12 of FIG. 1, in response to a compressed air mode being selected by a vehicle operator. In response to the compressed air mode being selected, operation of the first valve 346 and the second valve 348 may be adjusted to flow air to the boost device 360 so that compressed air flows to the tank 210 and allows the vehicle operator to use a compressed air operated device. The compressed air operated device may include air tools known to those of ordinary skill in the art.

The boost device 360 may include a first inlet 362 fluidly coupled to the second exhaust branch 356. The boost device 360 may further include a second inlet 364 fluidly coupled to an ambient atmosphere or to a second gas supply. The boost device 360 may be driven via gases flowing through the first inlet 362, wherein the gases from the first inlet are routed through a first outlet 366 and to the second exhaust passage 334. Air from the second inlet 364 may be compressed via the boost device 360 and directed to the tank 210 via a second outlet 368. Air from the second inlet 364 does not mix with gases from the first inlet 362 within or outside of the boost device 360. In this way, gases entering the boost device 360 via the first inlet 362 do not flow to the tank 210 and flow to only the second exhaust passage 334 after driving the boost device 360. By doing this, particles from the plurality of first cylinder 324 may not be carried by gases pumped therethrough to the tank 210 to be used to drive a compressed air driven device.

In the example of FIG. 3, arrows are used to denote an example direction of gas flow through the exhaust system 330. More specifically, arrows 392 illustrate exhaust air from the plurality of first cylinders 324. Arrows 394 illustrate exhaust gas from the plurality of second cylinders 328. Arrows 396 illustrate ambient air from an ambient atmosphere. Herein, exhaust air is differentiated from exhaust gas in that exhaust gas is a byproduct of fuel combusting with air. Exhaust gas is a product of ambient air being pumped through the engine 310 without a fuel injection mixing or combusting therewith. As such, the plurality of first cylinders 324 are deactivated and the plurality of second cylinders are activated within the example of FIG. 3 in which a compressed air mode is selected by the vehicle operator.

Exhaust air 392 from the plurality of first cylinder 324 flows to the first junction 352. During the compressed air mode, the first valve 346 may be moved to a more closed position and the second valve 348 may be moved to a more open position. In one example, the first valve 346 and the second valve 348 may be actuated to a variety of positions between a fully open position and a fully closed position. The fully open position may correspond to a position where gas flow through the valve is equal to a maximum value. Thus, the fully closed positon may correspond to a position where gas flow through the valve is a minimum value. In one example, the fully closed position blocks gas from flowing through the valve such that a flow rate therethrough is zero. A more open position may correspond to a position more similar to the fully open position than the fully closed position (e.g., 50% or more open). Thus, a more closed position may correspond to a position more similar to the fully closed position (e.g., less than 50% open). In one example, the first valve 346 may be fully closed and the second valve 348 may be fully open.

Exhaust air flows through the first valve 346 toward the boost device 360. The first inlet 362 may be configured to direct the exhaust air toward a rotor of the boost device 360, thereby allowing the exhaust air to drive the boost device 360. In one example, the boost device 360 is an air multiplier or other similar device configured to increase a pressure of a gas. The second inlet 364 may be configured to direct ambient air 396 into an interior volume of the boost device 360 hermetically sealed from the rotor such that the ambient air and the exhaust air do not mix. The ambient air is pressurized (e.g., compressed) by the boost device 360 and expelled through the second outlet 368 to the tank 210. As such, an amount of compressed air stored in the tank 210 may increase.

Exhaust air driving the boost device 360 may be expelled through a first outlet 366 and to the second exhaust passage 334 at a third junction 372 downstream of the second junction 356 relative to a direction of exhaust gas flow through the second exhaust passage 334. In one example, the third junction 372 is arranged proximally to the tailpipe. Additionally or alternatively, the third junction 372 may be arranged at different locations downstream of the second junction based on a location of the tank 210. For example, it may be desired to arranged the third junction 372 proximally to the tailpipe when the tank 210 is arranged in a truck bed or vehicle cargo area. However, in some examples, it may be desired to arranged the third junction 372 distal to the tailpipe to reduce an amount of tubing if the tank 210 is arranged distal to the tailpipe.

Thus, when the compressed air mode is selected, gases in the first exhaust passage 332 and the second exhaust passage 334 are blocked from mixing at the second junction 356 when compressed air is being produced. Furthermore, exhaust gases from the second exhaust passage 334 are blocked from entering and flowing to the boost device 360. During conditions outside of the compressed air mode, exhaust gases from the first bank 322 produced via the combustion of fuel and air are blocked from flowing to the boost device 360 via the second valve 348 being actuated to the fully closed position. In this way, a longevity of the boost device 360 may be increased due to particulates and unburned hydrocarbons not coming into contact therewith.

Turning now to FIG. 4, it shows a method 400 for adjusting operation of one or more exhaust valves in response to a request for a compressed air mode. Instructions for carrying out method 400 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the method described below.

The method 400 begins at 402, which includes determining one or more operating parameters. The one or more operating parameters may include but are not limited to an engine speed, an engine temperature, a vehicle speed, a throttle position, a manifold vacuum, and an air/fuel ratio.

The method 400 may proceed to 404, which may include determining if a compressed air mode is requested. The compressed air mode may be requested in response to a vehicle operator indicating a request to use compressed air from the tank 210. In one example, the vehicle operator may select to use the compressed air more by depressing a physical button or selecting one from a human-machine interface (HMI), which may include a vehicle navigation system, a global positioning system (GPS), a cellular device, a tablet, a laptop, or the like. Additionally or alternatively, the vehicle operator may indicate a desire to use the compressed air mode by connecting a compressed air device to the tank.

At any rate, if the compressed air mode is not selected, then the method 400 may proceed to 406, which includes adjusting a second exhaust valve to a fully closed position. The second exhaust valve blocks gases from the first cylinder bank from flowing to the boost device when in the fully closed position.

The method 400 may proceed to 408, which includes adjusting the first exhaust valve to a fully open position. The first exhaust valve allows gases from the first cylinder bank to flow to a second exhaust passage from a first exhaust passage to mix with gases from the second cylinder bank when in the fully open position.

The method 400 proceeds to 410, which includes mixing gases from the first exhaust passage with gases in the second exhaust passage at a second junction. The second junction may be arranged at an interface between a first exhaust branch and the second exhaust passage, wherein the first exhaust branch is fluidly coupled to each of the first exhaust passage and the second exhaust passage. In this way, exhaust gases from the first bank and the second bank may be mixed and expelled to an ambient atmosphere via only the second exhaust passage.

The method 400 proceeds to 412, which includes not flowing gases to the boost device. In one example, each of the first bank and the second bank of cylinders is fueled when the compressed air mode is not requested. By blocking exhaust flow to the boost device when compressed air is not requested, the longevity of the boost device may be increased.

Returning to 404, if the compressed air mode is requested, then the method 400 may proceed to 414, which includes determining if a park gear is engaged. Feedback from a sensor, such as a gear sensor, may be used to determine if the park gear is engaged. Additionally or alternatively, if the vehicle speed is zero and power is not being delivered to the wheels then it may be determined that the park gear is engaged.

If the park gear is not engaged and the compressed air mode is requested, then the method 400 proceeds to 416, which includes instructing the vehicle operator to stop the vehicle and/or engage the park gear. Instructions to the vehicle operator may be delivered via the HMI in the form of an alert on the navigation system scree, a text to the mobile device, an email, a phone call, or the like.

If the park gear is engaged, then the method 400 may proceed to 418, which includes activating the compressed air mode.

The method 400 may proceed to 420, which includes determining if compressed air is desired during the compressed air mode. Compressed air may be desired if a compressed air load of the tank is less than a threshold load. In one example, the threshold load is based on a total storage amount of the tank (e.g., 20%). Additionally or alternatively, compressed air may be desired in response to a compressed air driven device actively being used. Additionally or alternatively, compressed air may be desired during an entirety of the compressed air mode being executed. Additionally or alternatively, compressed air may be desired in response to a rate of compressed air consumption (e.g., a rate at which compressed air is flowing out of the tank) being greater than a threshold rate, wherein the threshold rate is based on a rate of compressed air production of the boost device.

If compressed air is not desired during the compressed air mode, then the method 400 may proceed to 422, which includes deactivating the engine cylinders of one or more of the first bank and the second bank. In one example, the cylinders of both the first bank and the second bank are shut-off and air and fuel are blocked from passing therethrough. As such, fuel is conserved. Additionally or alternatively, the first bank may be completely shut-off such that air does not flow therethrough while the second bank may remain active and combusting. Such a condition may be desired if cabin heating is requested, if an electrical device is being operated, and/or if an auxiliary device is connected to the vehicle and being used.

The method 400 may proceed to 424, which includes continuing to monitor a compressed air demand.

Returning to 420, if compressed air is desired, then the method 400 may proceed to 426, which includes deactivating the first cylinder bank. As such, the cylinders of the first cylinder bank may continue to receive and expel air, however, fueling to the cylinders is terminated. As such, the exhaust air produced by the cylinders of the first cylinder bank may comprise compressed ambient air and no byproducts due to combustion taking place.

The method 400 may proceed to 428, which includes activating a second cylinder bank. The cylinders of the second cylinder bank may receive fuel, thereby allowing combustion in the cylinders of the second cylinder bank to take place. In this way, exhaust gas with byproducts due to combustion is directed to the second exhaust passage.

The method 400 may proceed to 430, which includes adjusting the first exhaust valve to the fully closed position. As such, the first exhaust branch is sealed and gases in the first exhaust passage may not flow through the first exhaust branch to the second exhaust passage.

The method 400 may proceed to 432, which includes adjusting the second exhaust valve to the fully open position. As such, exhaust air in the first exhaust passage is directed to the boost device. The boost device draws air from an ambient atmosphere and compressed the ambient air while maintaining separation of the exhaust air and the boost air.

The method 400 may proceed to 434, which includes flowing boost air to the tank and mixing exhaust air with exhaust gas at the third junction. More specifically, ambient air is pressurized by the boost device and delivered to the tank. Exhaust air from the first bank, which is used to drive the boost device, flows from the boost device to the second exhaust passage via a second exhaust branch to mix with exhaust gas from the second bank. In this way, gases expelled from cylinders of the engine of the vehicle are not directed to the tank. By doing this, customer satisfaction may be improved with regard to an operation of a compressed air driven device.

In this way, a work system of a vehicle comprises a boost device arranged downstream of an exhaust junction. Valves spaced about the exhaust junction may guide a flow of exhaust to or away from the boost device. In one example, the valves are adjusted to flow exhaust air from a first cylinder bank to the boost device in response to a compressed air mode being selected. The first cylinder bank is blocked from receiving fuel while a second cylinder bank is fueled. As such, an overall fuel consumption to operate the compressed air mode is reduced relative to fueling each of the cylinder banks.

An embodiment of a system, comprises a boost device arranged in an exhaust passage, wherein the boost device is driven by exhaust air from a cylinder bank of an engine and configured to compress ambient air. A first example of the system further includes where a compressed air tank configured to received compressed air from the boost device, and wherein the compressed air tank is configured to drive a compressed air driven device. A second example of the system, optionally including the first example, further includes where the exhaust passage is a first exhaust passage and the cylinder bank is a first cylinder bank, wherein the first exhaust passage is configured to receive exhaust from only the first cylinder bank. A third example of the system, optionally including one or more of the previous examples, further includes where the engine further comprises a second cylinder bank configured to expel exhaust gas to a second exhaust passage separate from the first exhaust passage, wherein a first exhaust branch fluidly couples the first exhaust passage to the second exhaust passage at a location upstream of the boost device relative to a direction of exhaust flow, and wherein an outlet of the boost device fluidly couples the boost device to a portion of the second exhaust passage at a region proximal to a tailpipe. A fourth example of the system, optionally including one or more of the previous examples, further includes where the boost device comprises a first inlet, a second inlet, a first outlet, and a second outlet, wherein the first inlet is configured to admit exhaust air from the exhaust passage and the first outlet is configured to expel the exhaust air from the boost device to a tailpipe, and wherein the second inlet is configured to admit ambient air from an ambient atmosphere and the second outlet is configured to expel compressed ambient air to a tank. A fifth example of the system, optionally including one or more of the previous examples, further includes where fuel injections to the cylinder bank are blocked, and wherein exhaust air from the cylinder bank flows through an aftertreatment device prior to flowing to the boost device.

An embodiment of a vehicle system comprises an engine comprising a first cylinder bank comprising a plurality of first cylinders and a second cylinder bank comprising a plurality of second cylinders, a first exhaust passage configured to receive exhaust from only the plurality of first cylinders, a second exhaust passage configured to receive exhaust from only the plurality of second cylinders, a first catalyst arranged in the first exhaust passage and a second catalyst arranged in the second exhaust passage, a first junction arranged downstream of the first catalyst in the first exhaust passage relative to a direction of exhaust flow, a first exhaust branch extending from the first junction to the second exhaust passage, wherein a first exhaust valve is arranged in the first exhaust branch, a second exhaust branch extending from the first junction to a boost device, wherein a second exhaust valve is arranged in the second exhaust branch, and a boost device fluidly coupled to the second exhaust branch via a first inlet, the boost device further comprising a first outlet configured to expel exhaust air received from the first inlet to a portion of the second exhaust passage adjacent to a tailpipe downstream of a third junction at which the first exhaust branch and the second exhaust passage intersect, and wherein the boost device further comprises a second inlet configured to admit ambient air and a second outlet configured to expel compressed ambient air to a tank. A first example of the vehicle system further includes where a controller with computer-readable instructions stored on non-transitory memory thereof that when executed enable the controller to adjust a position of the first exhaust valve and the second exhaust valve in response to a compressed air mode being requested. A second example of the vehicle system, optionally including the first example, further includes where the instructions further enable the controller to deactivate fuel injectors of the first cylinder bank and maintain fuel injectors of the second cylinder bank active. A third example of the vehicle system, optionally including one or more of the previous examples, further includes where the position of the first exhaust valve is adjusted to a fully closed position configured to block exhaust air from flowing to the second exhaust passage via the first exhaust branch. A fourth example of the vehicle system, optionally including one or more of the previous examples, further includes where the position of the second exhaust valve is adjusted to a fully open position configured to allow exhaust air to flow through the second exhaust branch to the boost device. A fifth example of the vehicle system, optionally including one or more of the previous examples, further includes where the instructions further enable the controller to generate compressed air in response to a compressed air request, wherein the compressed air request is present in response a load of the tank being less than a threshold load or a compressed air driven device being coupled to the tank. A sixth example of the vehicle system, optionally including one or more of the previous examples, further includes where the instructions further enable the controller to determine if a park gear is engage when the compressed air mode is requested, further comprising where the instructions further enable the controller to instruct a vehicle operator to engage the park gear if the park gear is not engaged. A seventh example of the vehicle system, optionally including one or more of the previous examples, further includes where the instructions further enable the controller to adjust the position of the first exhaust valve and the second exhaust valve in response to the compressed air mode not being selected, wherein the position of the second exhaust valve is adjusted to a fully closed position and the position of the first exhaust valve is adjusted to a fully open position, and wherein the second exhaust valve blocks exhaust gas from the first cylinder from flowing to the boost device. An eighth example of the vehicle system, optionally including one or more of the previous examples, further includes where exhaust air and ambient air do not mix in the boost device, and wherein the boost device does not compress the exhaust air.

An embodiment of a method, comprises flowing exhaust air from a plurality of first cylinders to a boost device coupled to a tank configured to drive an air tool, the boost device arranged in a first exhaust passage and flowing exhaust gas from a plurality of second cylinders to a second exhaust passage, wherein the plurality of second cylinders are fueled and the plurality of first cylinders are free of fuel during a compressed air mode. A first example of the method further includes adjusting a first exhaust valve to a fully closed position and a second exhaust valve to a fully open position, wherein the first exhaust valve is arranged in a first exhaust branch fluidly coupling the first exhaust passage to the second exhaust passage at a location upstream of the boost device relative to a direction of exhaust flow, and wherein the second exhaust valve is arranged in a second exhaust branch fluidly coupling the first exhaust passage to the boost device. A second example of the method, optionally including the first example, further includes where driving the boost device with only exhaust air from the plurality of first cylinders, further comprising flowing exhaust air into the boost device via a first inlet and out of the boost device via a first outlet, wherein the first outlet is fluidly coupled to a portion of the second exhaust passage proximal to a tailpipe. A third example of the method, optionally including one or more of the previous examples, further includes where flowing a gas different than the exhaust air into the boost device via a second inlet and out the boost device via a second outlet, wherein the second outlet is fluidly coupled to the tank. A fourth example of the method, optionally including one or more of the previous examples, further includes where adjusting operation of the boost device in response to compressed air being requested, further comprising determining compressed air is requested in response to a load of the tank being less than a threshold load or an active air tool being coupled to the tank.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:

a boost device arranged in an exhaust passage, wherein the boost device is driven by exhaust air from a cylinder bank of an engine and configured to compress ambient air via separate sets of inlets and outlets of the boost device, wherein the exhaust passage is a first exhaust passage and the cylinder bank is a first cylinder bank, the first exhaust passage configured to receive exhaust from only the first cylinder bank.

2. The system of claim 1, further comprising a compressed air tank configured to received compressed air from the boost device, and wherein the compressed air tank is configured to drive a compressed air driven device.

3. The system of claim 1, wherein the engine further comprises a second cylinder bank configured to expel exhaust gas to a second exhaust passage separate from the first exhaust passage, wherein a first exhaust branch fluidly couples the first exhaust passage to the second exhaust passage at a location upstream of the boost device relative to a direction of exhaust flow, and wherein an outlet of the boost device fluidly couples the boost device to a portion of the second exhaust passage at a region proximal to a tailpipe.

4. The system of claim 1, wherein the boost device comprises a first inlet, a second inlet, a first outlet, and a second outlet, wherein the first inlet is configured to admit exhaust air from the exhaust passage and the first outlet is configured to expel the exhaust air from the boost device to a tailpipe, and wherein the second inlet is configured to admit ambient air from an ambient atmosphere and the second outlet is configured to expel compressed ambient air to a tank.

5. The system of claim 1, wherein fuel injections to the cylinder bank are blocked, and wherein exhaust air from the cylinder bank flows through an aftertreatment device prior to flowing to the boost device.

6. A vehicle system, comprising:
an engine comprising a first cylinder bank comprising a plurality of first cylinders and a second cylinder bank comprising a plurality of second cylinders;
a first exhaust passage configured to receive exhaust from only the plurality of first cylinders;
a second exhaust passage configured to receive exhaust from only the plurality of second cylinders;
a first catalyst arranged in the first exhaust passage and a second catalyst arranged in the second exhaust passage;
a first junction arranged downstream of the first catalyst in the first exhaust passage relative to a direction of exhaust flow;
a first exhaust branch extending from the first junction to the second exhaust passage, wherein a first exhaust valve is arranged in the first exhaust branch;
a second exhaust branch extending from the first junction to a boost device, wherein a second exhaust valve is arranged in the second exhaust branch; and
the boost device fluidly coupled to the second exhaust branch via a first inlet, the boost device further comprising a first outlet configured to expel exhaust air received from the first inlet to a portion of the second exhaust passage adjacent to a tailpipe downstream of a third junction at which the first exhaust branch and the second exhaust passage intersect, and wherein the boost device further comprises a second inlet configured to admit ambient air and a second outlet configured to expel compressed ambient air to a tank.

7. The vehicle system of claim 6, further comprising a controller with computer-readable instructions stored on non-transitory memory thereof that when executed enable the controller to adjust a position of the first exhaust valve and the second exhaust valve in response to a compressed air mode being requested.

8. The vehicle system of claim 7, wherein the instructions further enable the controller to deactivate fuel injectors of the first cylinder bank and maintain fuel injectors of the second cylinder bank active.

9. The vehicle system of claim 7, wherein the position of the first exhaust valve is adjusted to a fully closed position configured to block exhaust air from flowing to the second exhaust passage via the first exhaust branch.

10. The vehicle system of claim 7, wherein the position of the second exhaust valve is adjusted to a fully open position configured to allow exhaust air to flow through the second exhaust branch to the boost device.

11. The vehicle system of claim 7, wherein the instructions further enable the controller to generate compressed air in response to a compressed air request, wherein the compressed air request is present in response a load of the tank being less than a threshold load or a compressed air driven device being coupled to the tank.

12. The vehicle system of claim 7, wherein the instructions further enable the controller to determine if a park gear is engage when the compressed air mode is requested, further comprising where the instructions further enable the controller to instruct a vehicle operator to engage the park gear if the park gear is not engaged.

13. The vehicle system of claim 7, wherein the instructions further enable the controller to adjust the position of the first exhaust valve and the second exhaust valve in response to the compressed air mode not being selected, wherein the position of the second exhaust valve is adjusted to a fully closed position and the position of the first exhaust valve is adjusted to a fully open position, and wherein the second exhaust valve blocks exhaust gas from the first cylinder from flowing to the boost device.

14. The vehicle system of claim 6, wherein exhaust air and ambient air do not mix in the boost device, and wherein the boost device does not compress the exhaust air.

15. A method, comprising:
flowing exhaust air from a plurality of first cylinders to a first inlet of a boost device and expelling the exhaust air via a first outlet;
flowing a gas to the boost device via a second inlet and expelling compressed ambient air to a tank via a second outlet, wherein the tank is configured to drive an air tool, the boost device arranged in a first exhaust passage; and
flowing exhaust gas from a plurality of second cylinders to a second exhaust passage, wherein the plurality of second cylinders are fueled and the plurality of first cylinders are free of fuel during a compressed air mode.

16. The method of claim 15, further comprising adjusting a first exhaust valve to a fully closed position and a second exhaust valve to a fully open position, wherein the first exhaust valve is arranged in a first exhaust branch fluidly coupling the first exhaust passage to the second exhaust passage at a location upstream of the boost device relative to a direction of exhaust flow, and wherein the second exhaust valve is arranged in a second exhaust branch fluidly coupling the first exhaust passage to the boost device.

17. The method of claim 15, further comprising driving the boost device with only exhaust air from the plurality of first cylinders, wherein the first outlet is fluidly coupled to a portion of the second exhaust passage proximal to a tailpipe.

18. The method of claim 15, further comprising adjusting operation of the boost device in response to compressed air being requested, further comprising determining compressed air is requested in response to a load of the tank being less than a threshold load or an active air tool being coupled to the tank.

\* \* \* \* \*